United States Patent
Kim et al.

(10) Patent No.: US 10,951,320 B2
(45) Date of Patent: Mar. 16, 2021

(54) APPARATUS AND METHOD OF GENERATING BROADBAND SINGLE-SIDEBAND SIGNAL BASED ON LASER DIODE

(71) Applicant: ELECTRONICS AND TELECOMMUNICATIONS RESEARCH INSTITUTE, Daejeon (KR)

(72) Inventors: Joon Young Kim, Daejeon (KR); Min Kyu Sung, Seoul (KR); Jong Hyun Lee, Daejeon (KR); Seung Hyun Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/599,357

(22) Filed: Oct. 11, 2019

(65) Prior Publication Data

US 2020/0195351 A1 Jun. 18, 2020

(30) Foreign Application Priority Data

Dec. 13, 2018 (KR) .................. 10-2018-0161035

(51) Int. Cl.
*H04B 10/50* (2013.01)
*H04B 7/04* (2017.01)
*H04B 10/2575* (2013.01)

(52) U.S. Cl.
CPC .............. *H04B 10/504* (2013.01); *H04B 7/04* (2013.01); *H04B 10/2575* (2013.01)

(58) Field of Classification Search
CPC .............. H04B 10/504; H04B 10/2575; H04B 10/541; H04B 7/04
See application file for complete search history.

(56) References Cited

U.S. PATENT DOCUMENTS

| | | | |
|---|---|---|---|
| 7,146,103 B2* | 12/2006 | Yee ..................... | H04B 10/2507 398/68 |
| 2002/0171900 A1* | 11/2002 | Ono ................. | H04B 10/50572 398/183 |
| 2003/0038684 A1* | 2/2003 | Chethik ................... | H03D 9/00 331/66 |
| 2003/0189745 A1* | 10/2003 | Kikuchi ............. | H04B 10/5053 359/237 |

(Continued)

FOREIGN PATENT DOCUMENTS

KR 10-2007-0025285 A 3/2007
KR 10-2009-0013521 A 2/2009

*Primary Examiner* — Dzung D Tran
(74) *Attorney, Agent, or Firm* — LRK Patent Law Firm

(57) ABSTRACT

An apparatus for generating a broadband single-sideband signal based on a laser diode includes a first optical coupler configured to receive an optical carrier signal to divide the optical carrier signal into signals corresponding to a plurality of paths, a hybrid coupler configured to perform Hilbert transform on a radio frequency (RF) signal, a first slave laser and a second slave laser each configured to modulate optical output powers of the divided optical carrier signals by using a Hilbert-transformed RF signal, and a second optical coupler configured to receive an optical output power-modulated optical carrier signal to output a single-sideband signal.

13 Claims, 3 Drawing Sheets

(56) References Cited

U.S. PATENT DOCUMENTS

| | | |
|---|---|---|
| 2007/0047668 A1* | 3/2007 | Kim .................... H04B 1/68 |
| | | 375/301 |
| 2011/0103514 A1 | 5/2011 | Park et al. |
| 2011/0140746 A1 | 6/2011 | Park et al. |
| 2015/0071641 A1* | 3/2015 | Wen ................. H04B 10/541 |
| | | 398/98 |
| 2018/0267340 A1* | 9/2018 | Rohde ............. H04B 10/5561 |

* cited by examiner

APPARATUS AND METHOD OF GENERATING BROADBAND SINGLE-SIDEBAND SIGNAL BASED ON LASER DIODE

CROSS-REFERENCE TO RELATED APPLICATION

This application claims priority under 35 U.S.C. § 119 to Korean Patent Application No. 10-2018-0161035, filed on Dec. 13, 2018, the disclosure of which is incorporated herein by reference in its entirety.

BACKGROUND

1. Field of the Invention

The present invention relates to an apparatus and method of generating a broadband single-sideband signal based on a laser diode.

2. Description of Related Art

Interest in an analog mobile front-haul and indoor distributed antenna system (DAS) for transmitting rapidly-increasing mobile traffic by using an analog scheme instead of a conventional digital scheme is increasing.

Examples of technology for transmitting a massive mobile signal include a method of generating a single-sideband signal.

However, in the related art, there are various problems, and for example, a configuration thereof is complicated, the loss of an optical signal is large, and it is difficult to apply the related art to transmission of a broadband electrical signal.

SUMMARY

Accordingly, the present invention provides an apparatus and method of generating a single-sideband signal by using a low-price direct modulation laser diode in a mobile front-haul and indoor DAS for transferring massive mobile traffic on the basis of radio-over fiber (RoF) transmission technology.

The objects of the present invention are not limited to the aforesaid, but other objects not described herein will be clearly understood by those skilled in the art from descriptions below.

In one general aspect, a method of generating a broadband single-sideband signal based on a laser diode includes: receiving an optical carrier signal and a radio frequency (RF) signal; dividing, by a first optical coupler, the optical carrier signal into signals corresponding to a plurality of paths; inputting divided optical carrier signals to a plurality of slave lasers equal to number of the paths; inputting the RF signal to the plurality of slave lasers via a hybrid coupler; modulating, by the plurality of slave lasers, optical output powers of the divided optical carrier signals by using the RF signal; and receiving, by a second optical coupler, an optical output power-modulated optical carrier signal to output a single-sideband signal.

The laser diode may be a direct modulation laser diode.

The hybrid coupler may be a 90-degree hybrid coupler.

The RF signal passing through the hybrid coupler may be a Hilbert-transformed RF signal.

The plurality of slave lasers may include first and second slave lasers.

The method may further include controlling, by a bias phase controller, a phase of an output light of each of the first and second slave lasers.

The method may further include performing, by the bias phase controller, control so that a relative phase of the output light of each of the first and second slave lasers becomes 90 degrees.

The method may further include providing, by the bias phase controller, a driving current to the first and second slave lasers.

In another general aspect, an apparatus for generating a broadband single-sideband signal based on a laser diode includes: a first optical coupler configured to receive an optical carrier signal to divide the optical carrier signal into signals corresponding to a plurality of paths; a hybrid coupler configured to perform Hilbert transform on a radio frequency (RF) signal; a first slave laser and a second slave laser each configured to modulate optical output powers of the divided optical carrier signals by using a Hilbert-transformed RF signal; and a second optical coupler configured to receive an optical output power-modulated optical carrier signal to output a single-sideband signal.

The laser diode may be a direct modulation laser diode.

The hybrid coupler may be a 90-degree hybrid coupler.

The apparatus may further include a bias phase controller configured to control a phase of an output light of each of the first and second slave lasers, wherein the bias phase controller may perform control so that a relative phase of the output light of each of the first and second slave lasers becomes 90 degrees.

The bias phase controller may provide a driving current to the first and second slave lasers.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

The present invention relates to an apparatus and method of generating a broadband single-sideband signal based on a laser diode.

Figure 1:
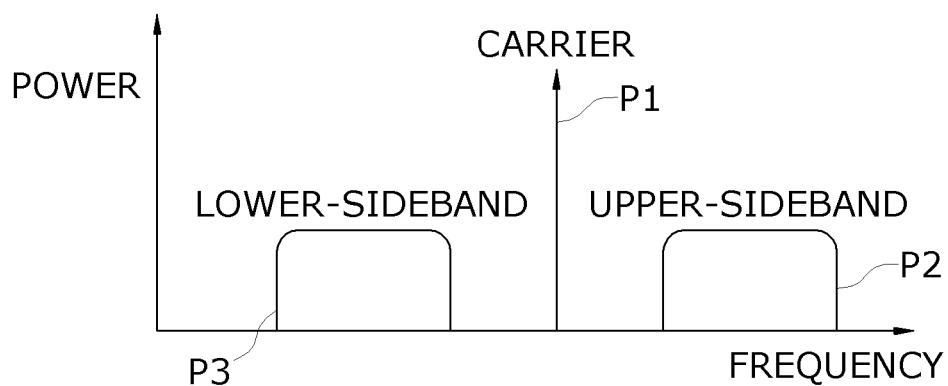
FIG. 1 is a diagram illustrating a double-sideband signal.
Figure 2:
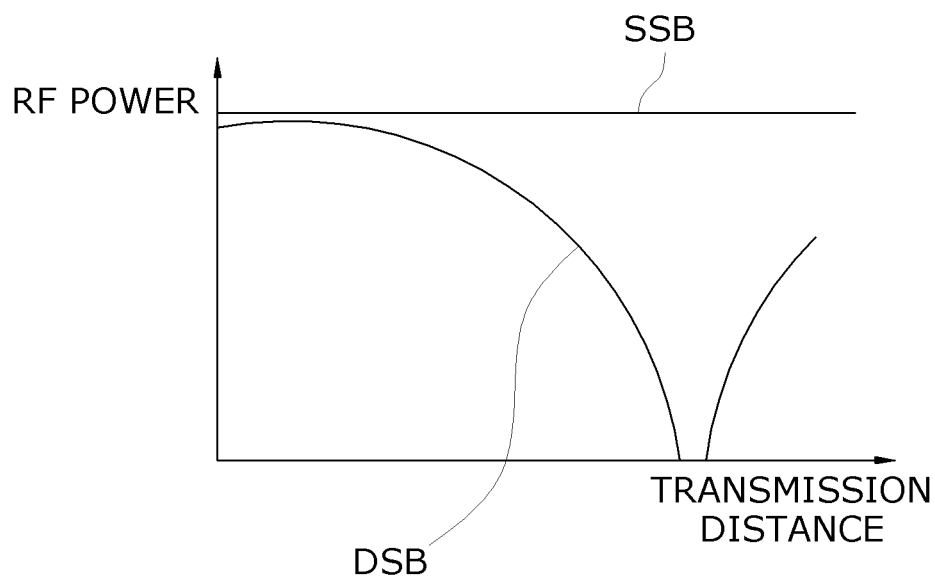
FIG. 2 is a diagram for describing a fading phenomenon caused by chromatic dispersion of an optical fiber.

FIG. 1 is a diagram illustrating double-sideband signals P2 and P3. FIG. 2 is a diagram for describing a fading phenomenon caused by chromatic dispersion of an optical fiber.

The demand for RoF technology for transmitting a massive mobile signal in a radio frequency (RF)-carrier or an intermediate frequency (IF)-carrier is expected to increase.

In this case, when an optical carrier is modulated by using a general optical intensity modulator (for example, MZM), a double-sideband (DSB) signal may be generated as in FIG. 1, and thus, the same carrier components (for example, an upper-sideband signal P2 and a lower-sideband signal P3) may be provided with respect to a carrier P1.

When the double-sideband signals P2 and P3 pass through an optical fiber, different refractive indexes may be felt based on a frequency, and thus, the upper-sideband signal and the lower-sideband signal may reach an optical receiver with a specific phase difference therebetween, based on the chromatic dispersion of an optical fiber where frequency components pass through the optical fiber at different speeds.

As a result, destructive inference and constructive interference may occur between the upper-sideband signal P2 and the lower-sideband signal P3, causing a fading phenomenon where a signal varies based on the transmission distance and RF power of a specific frequency component output from the optical receiver.

In order to solve such a problem, single-sideband (SSB) signal modulation may be used.

Referring to FIG. 2, a single-sideband signal may be generated by adjusting a bias voltage and an RF signal each applied to each electrode of a dual-drive MZM (DDMZM).

However, such technology may use a nonlinear period of an MZM and may not be applied to a large-scale RoF link requiring high linearity.

Moreover, a conventional MZM and an optical phase modulator may be serially connected to each other, and then, the single-sideband signal may be generated by appropriately adjusting a ratio of an amplitude modulation index and a phase modulation index.

However, such technology has a limitation which is not applied to a case of transmitting a broadband signal.

In order to solve the above-described problems, a dual-parallel MZM (DPMZM) may be used, but a total of four phase modulators and an additional phase shifter may be needed, causing an increase in cost and a drawback where control is complicated.

Moreover, a four-step optical coupler may be used, and thus, the loss of an optical signal may be large.

Therefore, single-sideband signal generating technology which maintains high linearity, is implemented at low cost, and is simple in control may be needed.

In an apparatus 100 and method of generating a broadband single-sideband signal according to an embodiment of the present invention, a single-sideband signal may be generated by using a low-price direct modulation laser diode, thereby decreasing the distortion of a massive mobile signal caused by fading which occurs due to the chromatic dispersion of an optical fiber.

Hereinafter, an apparatus 100 of generating a broadband single-sideband signal based on a laser diode according to an embodiment of the present invention will be described with reference to FIG. 3.

Figure 3:
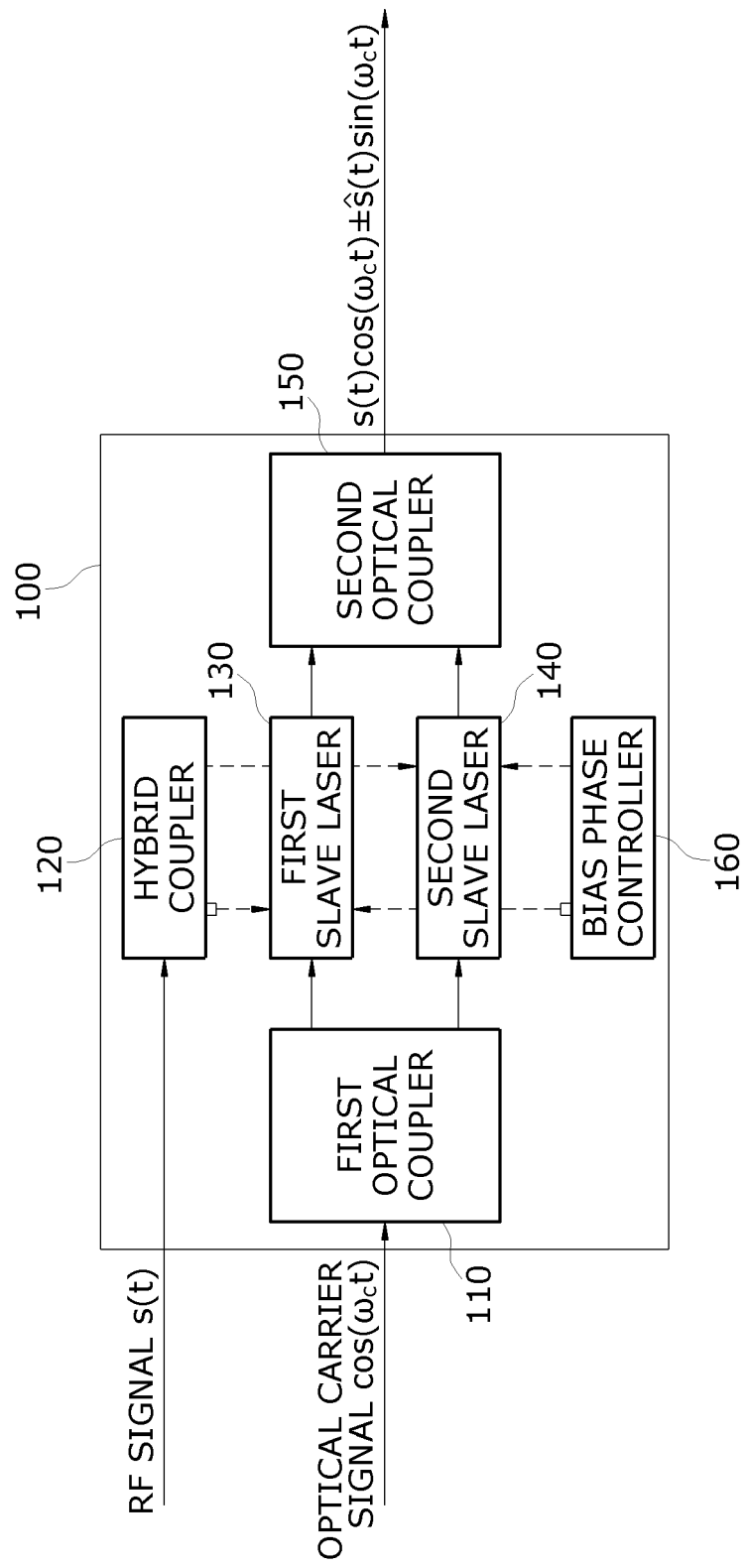
FIG. 3 is a block diagram of an apparatus for generating a broadband single-sideband signal according to an embodiment of the present invention.

FIG. 3 is a block diagram of an apparatus 100 for generating a broadband single-sideband signal according to an embodiment of the present invention.

The apparatus 100 for generating a broadband single-sideband signal according to an embodiment of the present invention may be characterized by using a direct modulation laser diode and may include a first optical coupler 110, a hybrid coupler 120, first and second slave lasers 130 and 140, and a second optical coupler 150.

First, in an embodiment of the present invention, an optical carrier signal "$\cos(\omega_c t)$" and an RF signal "$s(t)$" may be received.

The first optical coupler 110 may receive the optical carrier signal "$\cos(\omega_c t)$", divide the received optical carrier signal "$\cos(\omega_c t)$" to correspond to two paths, and transfer divided optical carrier signals to the first and second slave lasers 130 and 140.

The first and second slave lasers 130 and 140 may receive the divided optical carrier signals transferred through the two paths and may allow injection to be locked.

The hybrid coupler 120 may perform Hilbert transform on the RF signal "$s(t)$" to output a signal "$s(t)$" and a signal "$\hat{s}(t)$".

Here, the signal "$\hat{s}(t)$" may denote a signal generated by performing Hilbert transform on the signal "$s(t)$".

In this case, the hybrid coupler 120 according to an embodiment of the present invention may be a 90-degree hybrid coupler.

The first and second slave lasers 130 and 140 may modulate optical output powers of the divided optical carrier signals by using a Hilbert-transformed RF signal.

To this end, the apparatus 100 according to an embodiment of the present invention may further include a bias phase controller 160.

The bias phase controller 160 may provide a driving current to the first and second slave lasers 130 and 140 and may control a phase of an output light of each of the first and second slave lasers 130 and 140.

That is, the bias phase controller 160 may perform control so that a relative phase of an output light of each of the first and second slave lasers 130 and 140 becomes 90 degrees.

For example, when an output of the first slave laser 130 is $\cos(\omega_c t)$, an output of the second slave laser 140 may be $\pm\sin(\omega_c t)$.

As a result, the second optical coupler 160 may receive an optical carrier signal whose an optical output power has been modulated by each of the first and second slave lasers 130 and 140, and thus, may output a signal "$s(t)\cos(\omega_c t) \pm \sin(\omega_c t)$" which is a single-sideband signal.

Moreover, the apparatus 100 according to an embodiment of the present invention may include a memory which stores a program for processing data and controlling each of the elements illustrated in FIG. 3 and a processor for executing the program stored in the memory.

In this case, the memory may be a generic name for a volatile memory device and a non-volatile memory device which continuously maintains information stored therein even when power is not supplied thereto. For example, examples of the memory may include NAND flash memory such as compact flash (CF) card, secure digital (SD) card, memory stick, solid-state drive (SSD), and micro SD card, magnetic computer memory device such as hard disk drive (HDD), and optical disc drive such as CD-ROM and DVD-ROM.

For reference, the elements illustrated in FIG. 3 according to an embodiment of the present invention may each be implemented as a hardware type such as a field programmable gate array (FPGA) or an application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

Hereinafter, a method of generating a broadband single-sideband signal by using the broadband single-sideband signal generating apparatus 100 according to an embodiment of the present invention will be described with reference to FIG. 4.

Figure 4:
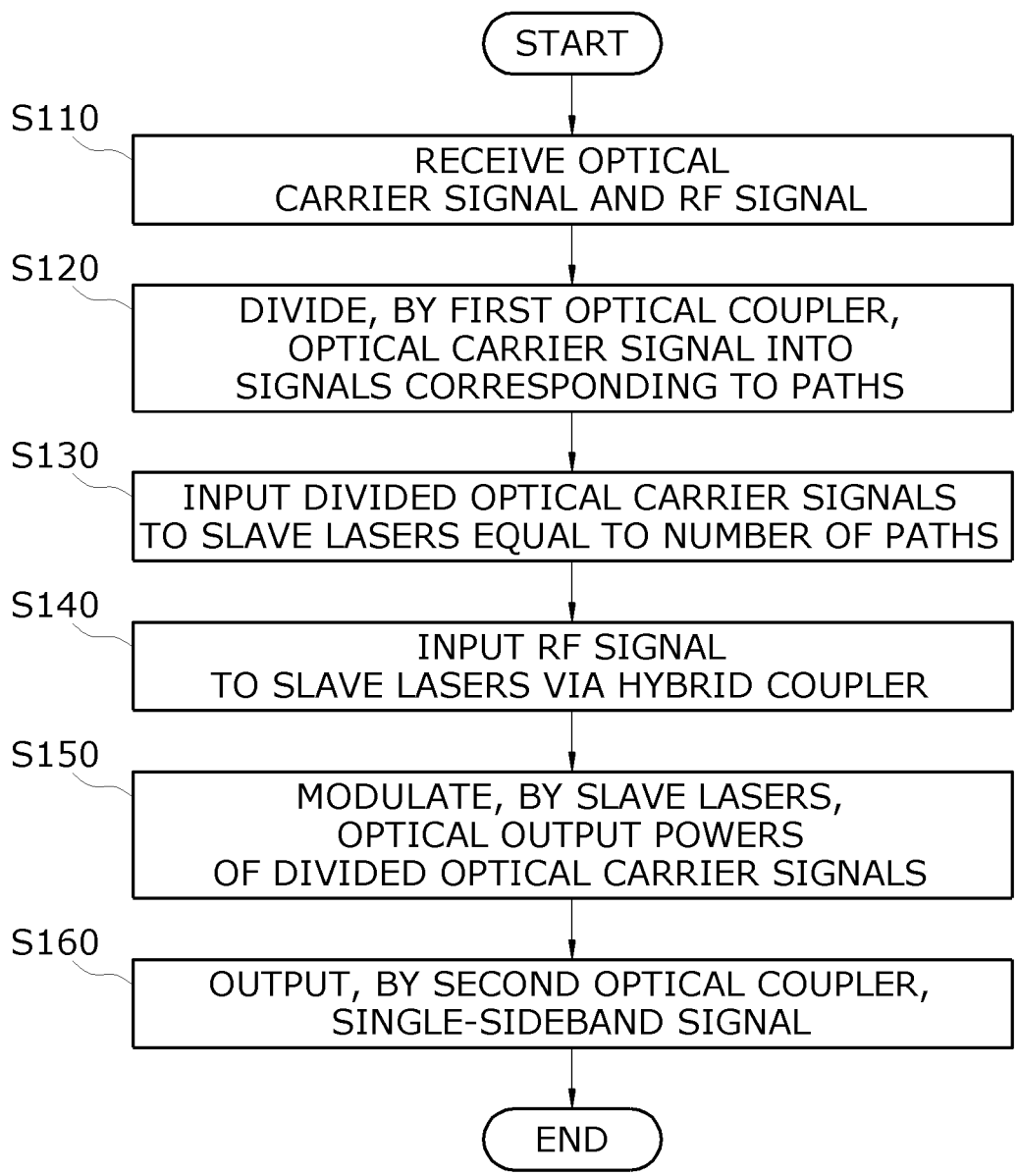
FIG. 4 is a flowchart of a method of generating a broadband single-sideband signal based on a laser diode according to an embodiment of the present invention.

FIG. 4 is a flowchart of a method of generating a broadband single-sideband signal based on a laser diode according to an embodiment of the present invention.

In an embodiment of the present invention, a laser diode may be a direct modulation laser diode.

First, in step S110, the broadband single-sideband signal generating apparatus may receive an optical carrier signal and an RF signal.

Subsequently, the first optical coupler 110 may divide the optical carrier signal into signals corresponding to a plurality of paths in step S120, and divided optical carrier signals may be input to a plurality of slave lasers 130 and 140 equal to the number of paths in step S130.

In this case, in an embodiment of the present invention, the plurality of slave lasers may include the first slave layer 130 and the second slave laser 140.

Subsequently, in step S140, the RF signal may pass through the hybrid coupler 120 and may be input to the plurality of slave lasers 130 and 140.

The hybrid coupler 120 may be a 90-degree hybrid coupler. Hilbert transform may be performed on the RF signal passing through the hybrid coupler 120, and a Hilbert-transformed RF signal may be input to each of the slave lasers 130 and 140.

Subsequently, in step S150, the plurality of slave lasers 130 and 140 may modulate optical output powers of the divided optical carrier signals by using the Hilbert-transformed RF signal.

At this time, the bias phase controller 160 may perform control so that a relative phase of an output light of each of the first and second slave lasers 130 and 140 becomes 90 degrees, and moreover, may provide a driving current to the first and second slave lasers 130 and 140.

As the optical output power is modulated in this manner, the second optical coupler 150 may receive an optical output power-modulated optical carrier signal to output a single-sideband signal in step S160.

In the above description, steps S110 to S160 may be further divided into additional steps according to an implementation embodiment of the present invention, or may be combined into fewer steps. Also, some steps may be omitted depending on the case, and a sequence of steps may be changed. Furthermore, despite other omitted description, description given above with reference to FIG. 3 may be applied to the method of generating a broadband single-sideband signal illustrated in FIG. 4.

The method according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

As described above, according to the embodiments of the present invention, an RoF link for transmitting a broadband mobile signal may be implemented without a separate DCF or a DPMZM where a configuration is complicated and the loss of an optical signal is large.

Particularly, according to the embodiments of the present invention, a single light transmitter may be applied to a large-scale RoF link in various environments such as a transmission distance, and thus, the cost expended in constructing and managing an infrastructure may be reduced.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a broadband single-sideband signal based on a laser diode, the method comprising:
   receiving an optical carrier signal and a radio frequency (RF) signal;
   dividing, by a first optical coupler, the optical carrier signal into signals corresponding to a plurality of paths;
   inputting the divided optical carrier signals to a plurality of slave lasers corresponding to the plurality of paths;
   inputting the RF signal to the plurality of slave lasers via a hybrid coupler;

modulating, by the plurality of slave lasers, optical output powers of the divided optical carrier signals using the RF signal; and receiving, by a second optical coupler, the optical output power-modulated optical carrier signals to output a broadband single-sideband signal.

2. The method of claim 1, wherein the laser diode is a direct modulation laser diode.

3. The method of claim 1, wherein the hybrid coupler is a 90-degree hybrid coupler.

4. The method of claim 3, wherein the RF signal passing through the hybrid coupler is a Hilbert-transformed RF signal.

5. The method of claim 1, wherein the plurality of slave lasers comprise first and second slave lasers.

6. The method of claim 5, further comprising controlling, by a bias phase controller, a phase of an output light of each of the first and second slave lasers.

7. The method of claim 6, further comprising performing, by the bias phase controller, control so that a relative phase of the output light of each of the first and second slave lasers becomes 90 degrees.

8. The method of claim 7, further comprising providing, by the bias phase controller, a driving current to each of the first and second slave lasers.

9. An apparatus for generating a broadband single-sideband signal based on a laser diode, the apparatus comprising:

a first optical coupler configured to receive an optical carrier signal and to divide the optical carrier signal into signals corresponding to a plurality of paths;

a hybrid coupler configured to perform Hilbert transform on a radio frequency (RF) signal;

a first slave laser and a second slave laser each configured to modulate optical output powers of the divided optical carrier signals using the Hilbert-transformed RF signal; and a second optical coupler configured to receive the optical output power-modulated optical carrier signals to output a broadband single-sideband signal.

10. The apparatus of claim 9, wherein the laser diode is a direct modulation laser diode.

11. The apparatus of claim 9, wherein the hybrid coupler is a 90-degree hybrid coupler.

12. The apparatus of claim 9, further comprising a bias phase controller configured to control a phase of an output light of each of the first and second slave lasers, wherein the bias phase controller performs control so that a relative phase of the output light of each of the first and second slave lasers becomes 90 degrees.

13. The apparatus of claim 12, wherein the bias phase controller provides a driving current to each of the first and second slave lasers.

* * * * *